Nov. 15, 1960     J. D. LOUTHAN     2,960,286
MEANS FOR PROVIDING DIRECTIONAL STABILITY

Filed Oct. 7, 1955     3 Sheets-Sheet 1

INVENTOR.
John D. Louthan
BY
W. R. Robertson
AGENT

Nov. 15, 1960  J. D. LOUTHAN  2,960,286
MEANS FOR PROVIDING DIRECTIONAL STABILITY
Filed Oct. 7, 1955  3 Sheets-Sheet 2

INVENTOR.
John D. Louthan
BY
W. R. Robertson
AGENT

Nov. 15, 1960  J. D. LOUTHAN  2,960,286
MEANS FOR PROVIDING DIRECTIONAL STABILITY
Filed Oct. 7, 1955  3 Sheets-Sheet 3

INVENTOR.
John D. Louthan
BY
W. R. Robertson
AGENT

United States Patent Office 2,960,286
Patented Nov. 15, 1960

2,960,286

MEANS FOR PROVIDING DIRECTIONAL STABILITY

John D. Louthan, Dallas, Tex., assignor to Chance Vought Aircraft, Incorporated, Dallas, Tex., a corporation of Delaware Filed Oct. 7, 1955, Ser. No. 539,223

7 Claims. (Cl. 244—91)

This invention relates to stabilizing means for aircraft, and more particularly to means for imparting directional stability to an aircraft flying at high supersonic speed.

Briefly described, the invention comprises a fin pivotally mounted near the bottom and near the aft end of an aircraft, actuating means, and control means. The fin is pivotable into a generally vertical position wherein it extends downward from the aircraft into smooth supersonic airflow for imparting directional stability to the aircraft, and is pivotable upward to a position in which it provides essentially no directional stability. This latter position may be chosen as one in which the fin is substantially horizontal and is of value in adding to the longitudinal stability of the aircraft. The fin does not replace conventional vertical and horizontal tail surfaces, but is employed as a versatile addition thereto on the aircraft, and is employed in preference to a fixed ventral fin for the reasons that a fixed ventral fin, because of its need for ground clearance in its one fixed position, cannot profitably be made to extend far enough below an aircraft to accomplish with sufficient efficiency its contemplated purpose, and can provide none of the longitudinal stability readily yielded by the convertible fin of the present invention. The actuating means comprises a mechanism or motor operably connected to the convertible fin and is supplied with energy for effecting displacement of the convertible fin either through a mechanical linkage with a power-actuated component, such as the landing gear, of the aircraft, or through a control means, from a power source included in the aircraft. In the latter case, the control means may optionally be arranged to effect coordination of the fin actuator with the landing gear of the aircraft at least to the extent of obviating downward extension of the fin from the aircraft when the landing gear is extended.

A principal object of this invention is to provide a means for imparting adequate directional stability to an aircraft in supersonic flight at high Mach numbers.

Another object is to provide a stabilizing means which imposes no net turning forces on the aircraft when the aircraft is in unyawed supersonic flight, but which, when the aircraft yaws, imposes turning forces on the aircraft which are of proper direction, magnitude, and duration for returning the aircraft to straight flight.

A further object of this invention is to provide such means having two principal operating aspects or arrangements of its interconnected parts: a first arrangement in which directional stability is imparted to the aircraft, and a second arrangement in which longitudinal stability is imparted to the aircraft by the invention.

Still another object is to provide means of the character thus far stated which is readily variable between its first and second operating aspects or arrangements.

A still further object is to provide a stabilizing means which automatically is placed in its arrangement for adding directional stability to the aircraft in advance of the need of the added directional stability, and which automatically is placed in its arrangement for adding longitudinal stability as (or before) the last-named stability addition becomes needed for best operation of the aircraft.

Yet another object of the invention is to provide means of the character thus far stated which operates automatically to provide adequate clearance between the parts of the invention and the ground during ground operations including landing and takeoff ground-runs of the aircraft.

An additional object of this invention is to provide a stabilizing means which, in response to the actuation of other elements of the aircraft operative for placing the aircraft in its aerodynamically clean, or high-speed, flight condition, assumes its arrangement for imparting directional stability to the aircraft; and in response to the actuation of elements for placing the aircraft in its landing condition, assumes its arrangement for adding to the longitudinal stability of the aircraft, no other than the latter arrangement being assumable by the parts of the invention when the landing gear of the aircraft is extended.

Yet another object is to provide a stabilizing means the external parts of which are efficiently faired to the aircraft to minimize aerodynamic drag.

Other objects and advantages will be apparent from the specification and claims and from the accompanying drawings which illustrate an embodiment of the invention.

Figure 1:
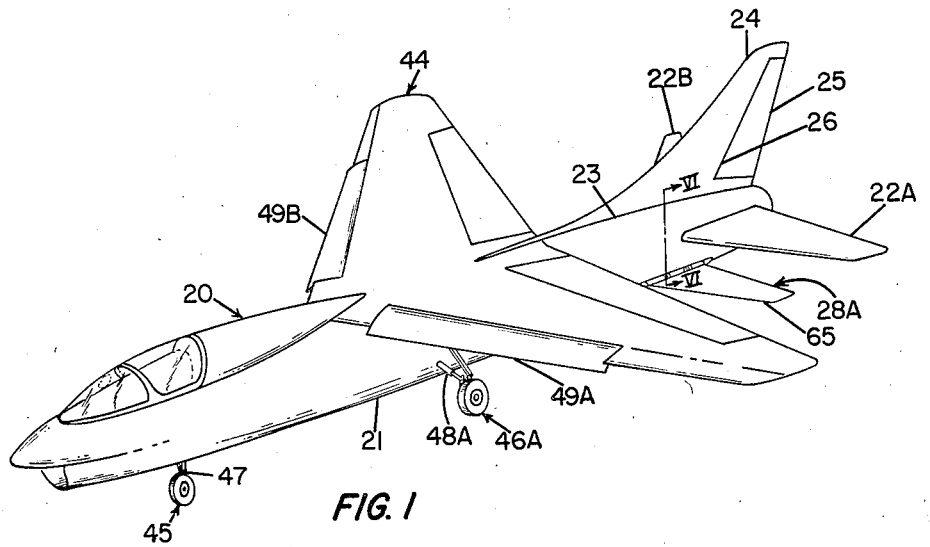
Figure 1 is a perspective view of an aircraft to which one form of the present invention has been applied and showing in their second or "up" position the external components of the invention which appear on the left-hand side of the aircraft, the aircraft having similar right-hand parts mounted on its right-hand side in symmetrical opposition to the left-hand parts shown.
Figure 2:
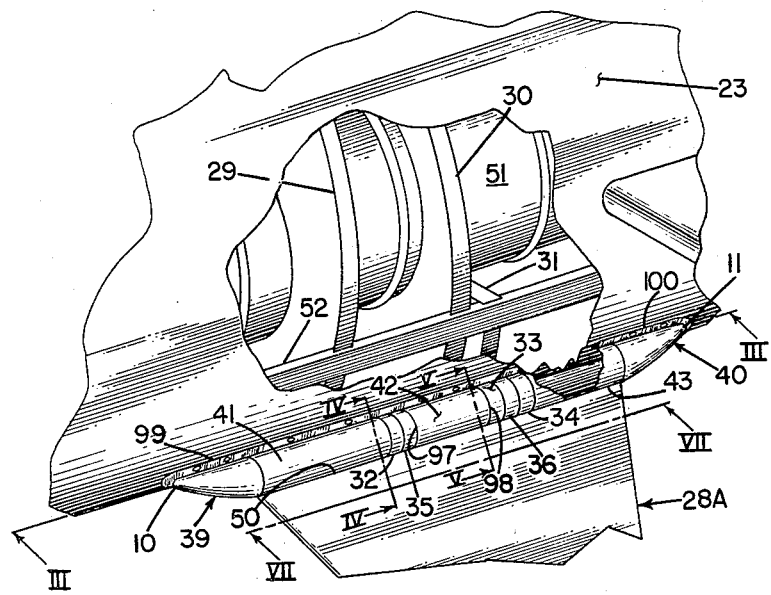
Figure 2 is an enlarged perspective view of part of the left-hand side of the fuselage showing external parts of the invention and having some of the fuselage skin cut away to show fixed structure of the fuselage, the convertible fin of the invention appearing in its first or "down" position.

Referring now to the drawings, with initial reference to Figure 1, there is shown, by way of example, an aircraft having a fuselage 20 supported and provided with longitudinal stability in flight by a wing 44 mounted on the fuselage midsection 21 and by a pair of horizontal tail surfaces 22A, 22B mounted on the fuselage aft section 23. The fuselage 20 acquires directional stability from a vertical stabilizer 24 mounted on the upper side of the fuselage aft section 23 and from a rudder 25 mounted in a trailing-edge cutout 26 in the vertical stabilizer 24. Both directional and longitudinal stability, but not both at any one time, are imparted to the aircraft by a left-hand convertible fin 28A mounted in a ventral location on the left-hand side of the fuselage aft section 23 somewhat forwardly of the left-hand horizontal tail surface 22A and by a matching, right-hand convertible fin (not shown) similarly mounted on the right-hand side of the fuselage aft section 23 symmetrically opposite the left-hand fin 28A. The convertible fin 28A and its right-handed counterpart are pivotally mounted on the fuselage aft section 23, and each is deflectable, about a respective hinge line generally disposed in a fore-and-aft direction relative to the fuselage 20, into a substantially horizontal position as shown in Figure 1 and a generally vertical position as shown in Figure 2 and, in dotted lines, in Figure 6. The convertible fins 28A, 28B are extended to their substantially vertical position at a time prior to acceleration of the aircraft to supersonic speeds high enough for the aircraft to experience a significant loss in the direction stability imparted to it by the vertical stabilizer 24 and rudder 25 (Figure 1). Means for effecting the deflection of the convertible fins 28A, 28B are provided in the form of actuating and control means (to be described) which preferably are adapted for automatic deflection of the fins 28A, 28B to their horizontal position at a pre-selected Mach number or operating condition of the aircraft. This may readily be accomplished by actuation of the control means by a Mach number sensitive unit, or machmeter; in the example shown, it was found preferable that the control means should be operated for placing the convertible fins 28A, 28B in their horizontal or "up" position when the aircraft of the example is placed in its landing condition.

A number of operations are accomplished in placing the aircraft in its landing condition: for instance, the landing gear, comprising a nose gear wheel 45 and two main gear wheels (46A left-hand, right-hand not shown) respectively and rotatably mounted on supporting members 47 and 48A which in turn are pivotally mounted on fuselage fixed structure are extended from within the fuselage 20 to the position shown; and a lift-increasing device or devices, such as a pair of leading edge droops 49A, 49B, are moved into their lift-increasing position on the wing 44. Forms of lift-increasing devices other than the droops 49A, 49B may of course be employed without altering the scope of the present invention; what should be understood in this connection is that the aircraft has wing lift increasing provisions or devices which are placed in a high-lift operating condition by an actuator or actuators under control of an operator of the aircraft, and that it is feasible to effect a coordination between the lift-increasing provisions and the convertible fins 28A, 28B such that the fins, as will be more fully described, are caused to move to their "up" position when the lift-increasing provisions are actuated for high lift of the wing 44. In the same way, the convertible fins 28A, 28B may be caused to move to their "down," generally vertical position when the lift-increasing provisions are actuated to adapt the wing 44 for high-speed flight.

As an alternative, the convertible fins 28A, 28B may be adapted for deflection to their "up" position when some other operation for placing the aircraft in its landing condition is effected, as, to follow the quoted examples, when a landing gear item such as 46A is extended, and for deflection to its "down" position when that operation is reversed (i.e., when the landing gear is retracted) to place the aircraft in its aerodynamically clean, high-speed operating condition.

Coordination of the convertible fins 28A, 28B with the landing gear will be found to be an entirely satisfactory arrangement in many aircraft, and it should be pointed out that this arrangement has a considerable benefit or safety feature: the fins 28A, 28B are automatically raised and thus have adequate ground clearance at landing, when the landing gear is extended. Further, it may be assumed that the landing gear will not be retracted while the weight of the aircraft is thereon, while wing droops or flaps, etc., often are tested and operated on the ground. Where it is found desirable, because of aerodynamic or other considerations, to operate the convertible fins 28A, 28B in coordination with provisions other than the landing gear, or to operate them together in independence of other systems, it is highly desirable, where the fins in their "down" position have inadequate ground clearance at landing and takeoff and during ground operations, that the fin control and/or actuating means be governed by the landing gear system to the extent that the convertible fins, if not already in their "up" position, are inescapably raised as the landing gear wheels are lowered, and cannot be lowered so long as the wheels are down. By this arrangement, which will be explained further, damage to the aircraft which could result from landing with the convertible fins in a position in which they would strike the ground, or from inadvertent lowering of the fins against the ground during ground operations, is obviated.

Since aircraft landing gear and wing lift increasing devices and means for their actuation are well developed and are well known, they are not further described herein. Similarly, no detailed description is given of the forms and functions of the aerodynamic surfaces of the aircraft (i.e., the wing 44, drops 49A, 49B, vertical stabilizer 24, rudder 25, and horizontal tail surfaces 22A, 22B) which cooperate with the convertible fins 28A, 28B to impart stability to the aircraft. Throughout the detailed description of the convertible fins 28A, 28B and their mounting, actuating, and control means which follows, it should be borne in mind that the right-hand fin 28B is the opposite-handed counterpart, together with its mounting means, of the left-hand fin 28A and the mounting means therefor; consequently, except where specific notation to the contrary is made, all that is said herein concerning the left-hand fin 28A is applicable to the right-hand fin 28B, allowance being made for the opposite-handedness of the latter.

Reference is now made to Figure 2, in which figure the left-hand convertible fin 28A is shown in its lowered or "down" position. Particularly when the aircraft yaws in supersonic flight, comparatively high aerodynamic loads are imposed upon the fin 28A and are transmitted through the fin mounting means (to be described) into the fuselage aft section 23; hence, it is advisable that suitably strong fixed structure be provided in the fuselage aft section 23 for rigid attachment thereto of the fin mounting means. In the example shown, this is conveniently accomplished by providing in the fuselage aft section 23 a forward bulkhead 29 which encircles, somewhat forward of the chordwise middle of the fin 28A at its root 50, a jet engine 51 installed in the fuselage aft section 23. Also provided are an intermediate bulkhead 30 located somewhat aft of the fin chord's middle, and still further to the rear, an aft, partial bulkhead 31 extending from a left-hand lower longeron 52 of the fuselage aft section 23 across the bottom portion of the fuselage to a symmetrically opposite right-hand lower longeron (not shown). The respective, aligned ends 32, 33, and 34 of a fuselage forward hinge fitting and a pair of fuselage aft hinge fittings (to be described more fully) protrude outwardly and downwardly from the left-hand side of the fuselage aft section 23 near its bottom. Interdigitated with the fuselage hinge fitting ends 32, 33, 34 are forward and aft hinge fitting ends 35, 36 of the fin 28A. The fuselage and fin hinge fitting ends 32, 33, 34, 35, 36 are cylindrical about a common axis extending generally parallel to the fore-and-aft axis of the fuselage 20, extend through half their cylindrical diameter outside the fuselage, the remaining portions of their diameter lying within the fuselage, and have flat forward and aft faces which are normal to their common axis. The respective, mutually adjoining faces of the forward fuselage and fin fitting ends 32, 35 lie closely and rotatably in contact with each other, as do adjoining faces of the fuselage and fin aft fitting ends 33, 34, 36; hence, there is little or no fore-and-aft play between them. The fuselage and fin fitting ends 32—36 are all of one same diameter; adjoining fitting ends thus together form aerodynamically smooth, substantially continuous surfaces unbroken by discontinuities between faying fittings.

Figure 3:
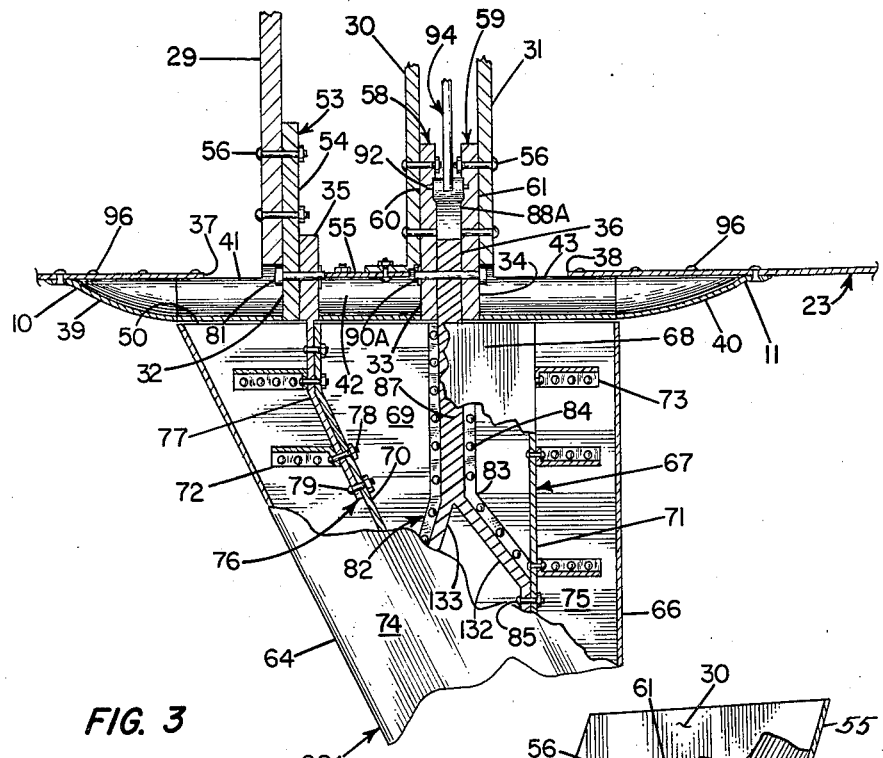
Figure 3 is a partial longitudinal sectional view of the fuselage fixed structure, the convertible fin, and the fin mounting means taken in the plane of line III—III of Figure 2.
Figure 4:
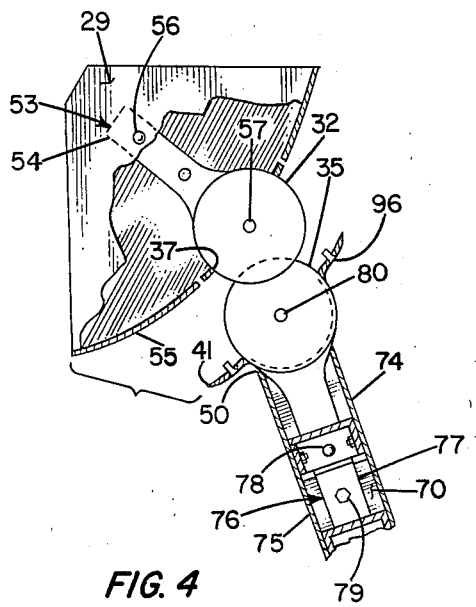
Figure 4 is an enlarged vertical, transverse, sectional, partially exploded view taken on line IV—IV of Figure 2.

With reference to Figures 3 and 4, the fuselage forward hinge fitting 53 is located on the aft side of the forward bulkhead 29, has a main, elongated body portion 54 extending inwardly into the fuselage aft section 23 from near the fuselage skin 55 and rigidly attached to the bulkhead 29 by fasteners 56, and further has the previously mentioned shorter, cylindrical end portion 32, half of whose diameter extends outside the fuselage aft section 23 through a fuselage skin forward opening 37. The cylindricality of the end 32 is interrupted only at its junction with the main body portion 54. The generally fore-and-aft axis about which the cylindricality of the end 32 is formed is generally level and parallel with the longitudinal axis of the fuselage 20 (Figure 1) and impinges on the fuselage skin contour at the opening 37 (Figures 3, 4).

Figure 5:
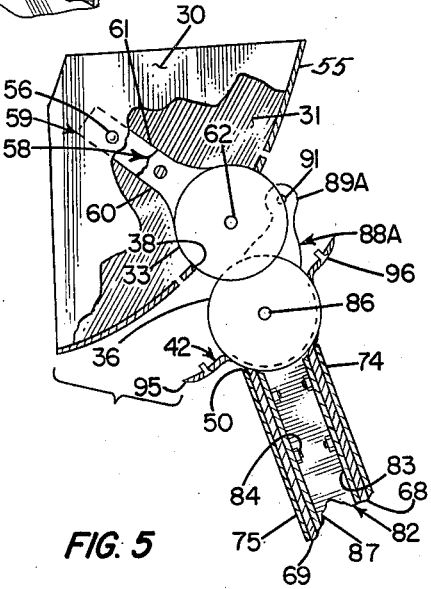
Figure 5 is an enlarged vertical, transverse, sectional, partially exploded view taken on line V—V of Figure 2.

With reference to Figures 3 and 5, a pair of fuselage aft hinge fittings 58, 59 lie in spaced, aligned relation to each other and are respectively mounted on the intermediate and aft bulkheads 30, 31. Each respective fitting 58, 59 has a main body portion 60 or 61 extending within the fuselage aft section 23 and a shorter end portion 33 or 34 which extends outside the fuselage aft section 23 through an aft opening 38 in the fuselage skin 55. The main bodies 60, 61 of the two fittings 58, 59 are secured to their respective bulkheads 30, 31 by fasteners 56 capable of withstanding considerable shear loads which especially are placed on the fasteners 56 by the fin 28A through the aft fittings 58, 59 when the aircraft yaws in supersonic flight. The outer end portions 33, 34 are cylindrical, are of the same diameter as the forward hinge fitting end 32, are coaxial with the latter, and extend for half their diameter outside the fuselage aft section 23 through the skin aft opening 38. Each end 33, 34 is pierced with a round, central hole 62, the holes 62 being coaxial with each other and with a fuselage forward hinge fitting central hole 57 (Figure 4), and having an axis which impinges on the contour of the fuselage skin 55 at the skin aft opening 38.

The fuselage forward and aft hinge fitting ends 32, 33, and 34 are smoothly finished on all their surfaces. The fuselage skin 55 preferably is unbroken except at the forward and aft skin openings 37, 38.

Figure 7:
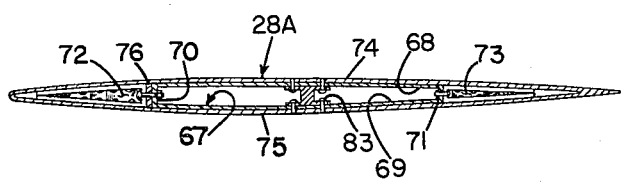
Figure 7 is a longitudinal vertical sectional view taken on the line VII—VII of Figure 2.
Figure 6:
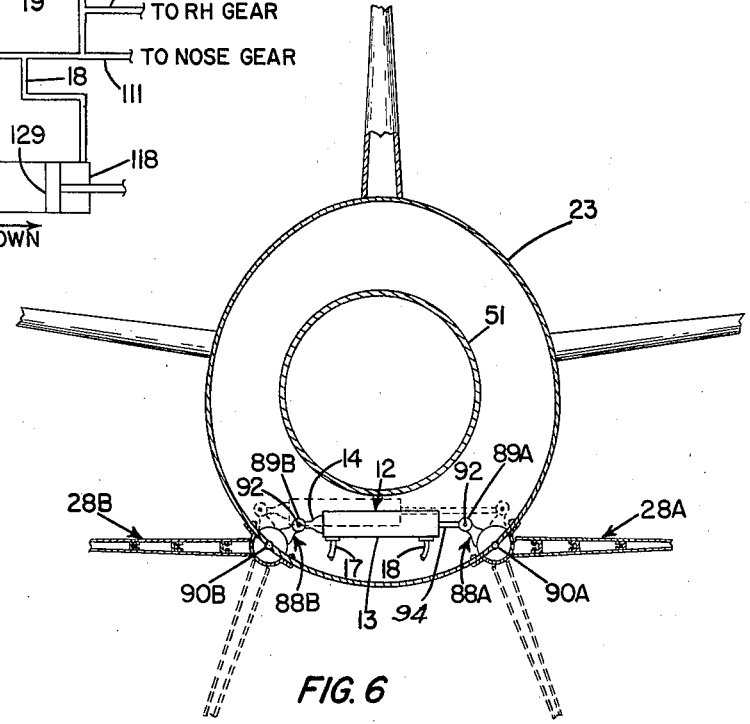
Figure 6 is a vertical, transverse, sectional view taken in the plane of line VI—VI of Figure 1 and showing in solid line the convertible fins and a preferred actuator therefor in the "up" position of the fins, the fins further being shown, in dotted lines, in their "down" position.

The fin 28A may vary somewhat in shape, but should be of sufficient spanwise length and chordwise breadth to extend downwardly well into comparatively smooth, undisturbed supersonic airflow below the fuselage 20 (Figure 1) when the fin is in its "down" position, and to present sufficient area to that airflow to supply in adequate amount the desired forces for directional stabilization of the aircraft. As may be seen in Figures 1 and 3, the fin leading edge 64, in the present example, is swept back, that is, slanted rearwardly from the fin root 50 to the fin tip 65, and the fin trailing edge 66 is generally normal to the longitudinal axis of the fuselage 20. As shown in Figure 6, the thickness of the fins 28A, 28B diminishes somewhat from the fin root 50 toward the fin tip 65. As shown in Figure 7, the fin 28A is symmetrically formed about its chord plane and thus, when its angle of incidence relative to the airstream is zero, produces no lifting forces in any direction.

Referring to Figures 3 and 7, the fin 28A is strongly constructed to enable it to withstand and to transmit into the fuselage aft section 23 on which it is mounted the relatively high aerodynamic loads, laterally applied in relation to the fuselage aft section, which at times are imposed on the fin. The main structural member of the fin 28A is an elongated, four-sided, box-like member 67 made of relatively heavy-gage material and having upper, lower, forward, and aft sides 68, 69, 70, 71 running substantially the spanwise length, from root to tip, of the fin 28A. To the forward and aft sides 70, 71 of the box-like member 67 are attached leading and trailing edge ribs 72, 73 which extend respectively forward and aft of the box-like member 67. The ribs 72, 73 add strength to the fin construction and act as formers which give proper shape at the fin leading and trailing edge portions to upper and lower skins 74, 75 which smoothly cover the entire fin 28A. The trim of the fin upper and lower skins 74, 75 at the fin root must be such as to provide close, even clearance with the fin fairings, presently to be described, or to provide light, even contact with the fin fairings to minimize or eliminate all gaps between the fin 28A and its fairings throughout the fin's range of operation.

Referring to Figures 3 and 4, the fin forward hinge fitting 76 has a cylindrical end portion 35 which lies outside the fin 28A, and an elongated portion 77 lying inside the fin. The elongated portion 77 extends from the fin root 50 toward the fin tip 65, lies against the box-like member's forward side 70, is abutted by the aft ends of two of the leading edge ribs 72, is attached jointly with the ribs 72 to the forward side 70 by fasteners 78, and is further attached to the forward side 70 by other fasteners 79.

The cylindrical end 35 of the fin forward hinge fitting 76 extends from the fin root 50 through the fuselage forward skin opening 37, and protrudes through half its diameter into the fuselage aft section 23. The cylindricality of the end 35 is formed about an axis collinear with that of the fuselage forward and aft hinge fitting ends 32, 33, 34, and is interrupted only at the juncture of the fitting end 35 with the elongated portion 77. The diameter of the end 35 is the same as that of the fuselage forward hinge fitting end 32 with which it mates. The fitting end 35 has a round hole 80 centered on the end's axis and lying in alignment with the central hole 57 of the fuselage fitting end 32. The fin forward fitting 76 is attached to the fuselage forward fitting 53 by a pivot pin 81 inserted into the aligned holes 80 and 57. The air loads imposed through the fin 28A on the fin forward hinge fitting 76 are nearly altogether drag loads which would tend to rotate the fin tip 65 rearwardly; as these loads are, comparatively, not very great, the fin forward hinge fitting 76 need not be made of especially heavy gage material nor constructed to take extremely high loads, as must the fin aft hinge fitting 82, which is described immediately below.

With reference to Figures 3 and 5, the fin aft hinge fitting 82 receives and transmits into the fuselage aft section 23 the greater part of the laterally directed aerodynamic loads imposed upon the fin 28A; hence, this fitting 82 is properly made of comparatively heavy gage material and is made to extend amply, in a spanwise direction, into the fin. The fitting main body portion 87 lies within the fin 28A and has upper and lower flanges 83 pierced by fasteners 84 by means of which the fitting 82 is attached to the upper and lower sides 68, 69 of the box-like member 67. The main body portion 87 is bifurcate, and the respective prongs 132, 133 of the bifurcation are attached not only to the upper and lower sides 68, 69 but are attached by fasteners 85 to the forward and aft sides 70, 71 of the box-like member 67. The fin aft fitting end 36, like the forward fitting end 35, is cylindrical in shape and extends outside the fin 28A at the fin root 50. The end 36 has a round central hole 86 which is coaxial with the holes 62 of the fuselage aft fitting ends 33, 34, with which the fin aft fitting end 36 mates, and to which it is attached by a pivot pin 90A inserted in the holes 86 and 62. The cylindricality of the fin aft fitting end 36 is interrupted by its junction with the fitting main body 87 and also by a horn 88A to be described. The fin forward and aft hinge fitting ends 35, 36 are smoothly finished on all their surfaces.

Integral with and projecting inboard from the end of the aft hinge fitting 82, the lever or horn 88A (Figures 3, 5 and 6) has an inboard end 89A which, when the fin 28A is in its "up" position, is somewhat above the level of the centerline of the pivot pin 90A and which moves upward through an accurate path to a position wherein it lies near the fuselage skin 55 when the fin is swung to its "down" position. Thus, by applying force to the horn end 89A so as to cause it to swing up or down, the fin 28A may be deflected between its "down" and "up" positions. The horn end 89A has a hole 91 pierced therethrough in a fore-and-aft direction for the reception of a pin 92 by means of which the horn 88A is attached to a rod end 94 (Figure 3) of the fin actuating means.

In regard to the fuselage skin openings 37, 38, they must each be high and wide enough to accommodate the diameter of the fuselage and fin hinge fitting ends 32—36. In addition, the aft opening 38 must be extended toward the rear at least far enough to permit insertion of the aft pivot pin 90A into the aft fitting ends 33, 34, 36, while similar forward extension must occur at the forward opening 37 to permit insertion of the forward pivot pin 81 into the forward fitting ends 32, 35.

A description will now be given of the fairing means by which aerodynamic drag attributable to the presence of the convertible fins 28A, 28B on the aircraft is minimized. With reference to Figure 2, the fairing means comprises forward and aft tapered fairings 39, 40 and forward, middle, and aft semi-cylindrical fairings 41, 42, 43. These five fairings are rigidly mounted on the fuselage aft section 23, and virtually or entirely fill the intervals between the fin root 50 and fuselage skin 55 not filled by the hinge fitting ends 32—36.

The interval between the fin forward fitting end 35 and the neighboring fuselage aft fitting end 33 is filled by the middle fairing 42, that between the fuselage aft fitting end 34 and the fin trailing edge 66 is filled by the aft semi-cylindrical fairing 43, and the interval between the fuselage forward fitting end 32 and the fin leading edge 64 is occupied by the forward semi-cylindrical fairing 41. The forward tapered fairing 39 extends forward along the fuselage skin 55 from the forward semi-cylindrical fairing 41, and the aft tapered fairing 40 extends rearwardly from the aft semi-cylindrical fairing 43.

With added reference to Figures 3 and 5, the semi-cylindrical fairings 41, 42, 43 are not all of the same length, but otherwise are sufficiently similar that a description of the middle fairing 41 will apply also to the fairings 41 and 43, the differences of location of the respective fairings 41, 42, 43 being borne in mind. The middle fairing 42 comprises half a cylindrical tube having the same outside diameter as the hinge fitting ends 32—36, and along its longitudinal edges has upper and lower flanges 95 by means of which the fairing 42 is attached by fasteners 96 to the fuselage skin 55 in such location that the axis about which its cylindricality is formed coincides with the corresponding axis of the hinge fitting ends 32—36. The forward and aft ends 97, 98 of the fairing 42 are trimmed in a plane normal to the fairing's axis and fit snugly without gaps against the neighboring hinge fitting ends 33, 35 lyng immediately forward and aft of the fairing 42.

The tapered fairings 39, 40 are preferably of split ogival shape and should be of the same diameter at their bases as are the respective, smoothly abutting ends of the forward and aft semi-cylindrical fairings 41, 43. The tapered fairings 39, 40 have flanges 99, 100 on their longitudinally extending edges by means of which they are attached by fasteners 96 (Figure 3) to the fuselage skin 55. At their pointed ends 10, 11, the tapered fairings 39, 40 blend smoothly into the contour of the fuselage skin 55.

The actuating means of the invention may vary widely in form, any mechanism generally being acceptable which is efficient for moving the convertible fins 28A, 28B to desired positions in their deflection range and for holding the fins firmly in such positions against air loads imposed upon them. In some applications, the actuating means may well consist of a direct mechanical linkage of the fin horns 88A, 88B (Figure 6) with the operating mechanism of a system for effecting changes between the clean and landing conditions of the aircraft: for instance, with a landing gear mechanism, or with a wing lift increasing mechanism. In such cases, no control means, as such, is required for the actuating means, and the fins 28A, 28B are automatically raised and lowered by operation of the mechanism for operating the landing gear, wing flaps, etc. chosen for connection to the fin horns 88A, 88B. From examination of Figure 6, it will be obvious that the motor 12 may be connected for operation of the fins 28A, 28B independently of the landing gear or any other system of the aircraft. Whether the fins 28A, 28B are provided with their own actuator or are operated by a mechanical linkage of the sort described, the arrangement should be such that, where the fins are of such spanwise length that in their "down" position they do not have adequate ground clearance for takeoffs, landings, and ground operations, the fins are deflectable to their "down" position only when the aircraft is airborne, and are automatically deflected to their "up" position before landing touchdown is effected.

With continued reference to Figure 6, the actuating means employed for the fins 28A, 28B of the present example is a hydraulic cylinder or motor 12 having a barrel 13 equipped with an end fitting 14 pivotally attached by a fastener 92 to the right-hand fin horn 88B, and further having a piston rod 94 pivotally attached at its outer end by another fastener 92 to the left-hand fin horn 88A. The cylinder 12 thus is mounted in floating fashion between the horns 88A, 88B to which it is attached, and extends transversely of the fuselage. The cylinder 12 receives and discharges hydraulic fluid through a pair of hydraulic lines 17, 18 which communicate between a hydraulic system of the aircraft and the interior of the barrel 13. To allow for motion of the barrel 13 relative to the fuselage aft section 23 which occurs when the cylinder 12 is operated, the lines 17, 18 should be of adequate length and preferably should be of flexible construction.

Figure 8:
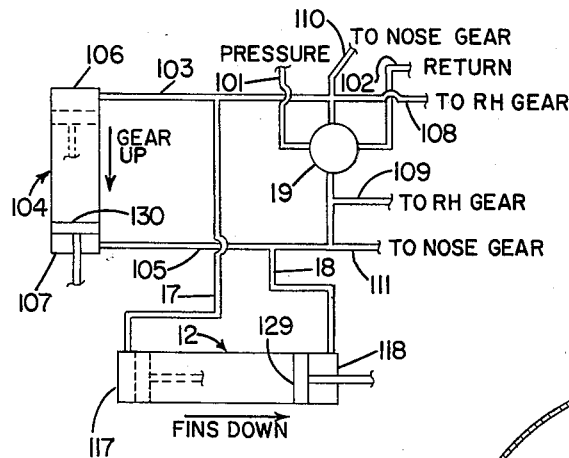
Figure 8 is a schematic diagram of one form of actuating and control means for operation of the convertible fins of the invention.

With reference to Figure 8, the power and control means for supplying hydraulic fluid to the cylinder 12 will now be described. A two-way hydraulic selector valve 19 receives hydraulic fluid through a line 101 from the pressure or outlet port of a source of hydraulic power (not shown) comprised by the aircraft, and returns hydraulic fluid to an inlet port of the hydraulic power source through a line 102. The valve 19 is connected by a line 103 to one end 106 of a hydraulic cylinder or motor 104 for actuation of a landing gear item which, for convenience, is assumed to be the left-hand main gear of the aircraft. The valve 19 is connected by a line 105 to the other end 107 of the cylinder 104. Where the arrangement of the aircraft is such that the cylinder 104 must extend to retract the left-hand landing gear which it actuates, the fin actuating cylinder 12 is connected by the lines 17, 18 to the respective lines 103, 105 leading from the valve 19 to the cylinder 104 as shown in Figure 8. In cases where the cylinder 104 must retract to retract the left-hand landing gear, the connections of the fin cylinder lines 17, 18 should be reversed, i.e., the line 18 should T into the line 103, and the line 17 into the line 105, the mode of connection being such in either case that the fin actuating cylinder 12 extends when the aircraft is placed in its aerodynamically clean, landing-gear-up condition, and retracts when the aircraft is placed in its wheels-down, landing condition. The lines 108, 109, 110, and 111, shown cut away in the drawing, lead in pairs to a nose gear cylinder and a right-hand main gear cylinder (not shown) of the aircraft.

Although it is generally desirable for reasons of safety that the convertible fins should have some coordination with the landing gear of the aircraft, it is conceivable that, in some instances, separate control of the fin actuator 12 in complete independence of other actuators in the aircraft may be desired. In such a case, the valve 19 may be appropriated for the sole use of the fin actuator 12, another valve and other hydraulic lines may be provided for the landing gear system, and the portions of the lines 103, 105 extending from the lines 17, 18 to the landing gear cylinder 104, and also the lines 108 through 111, may be eliminated.

Figure 9:
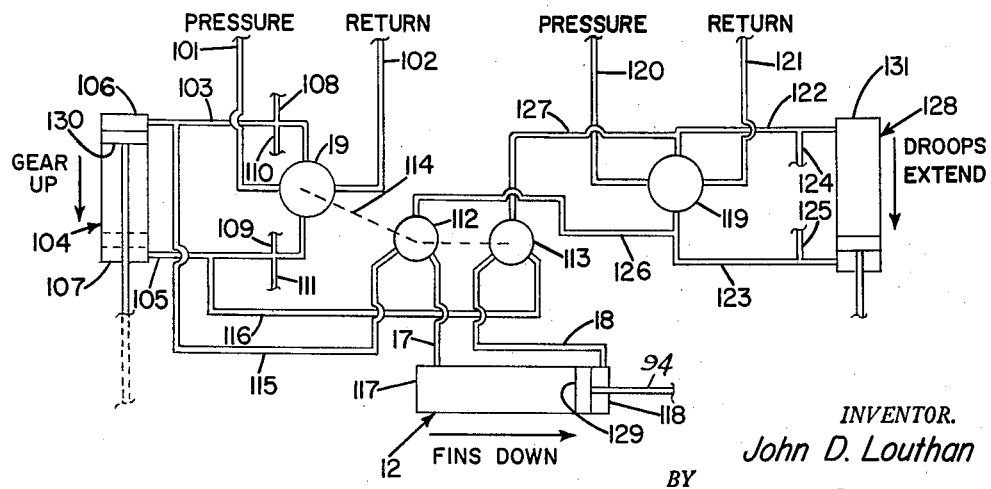
Figure 9 is a schematic diagram of an alternate form of actuating and control means for operation of the convertible fins of the invention.

In Figure 9 is shown a power means and control means for actuation of the convertible fins in association with actuation of the wing leading edge droops 49A, 49B (Figure 1) of the aircraft. With the landing gear 46A up, the convertible fins 28A, 28B are raised when the droops 49A, 49B are extended to their high-lift position, and are lowered when the droops are retracted; yet, even though the droops through inadvertency or malfunction are not extended when ordinarily they should be, the convertible fins will be raised when the landing gear is extended, and cannot be lowered while the landing gear is down. Operation of the droops while the aircraft is on the ground is possible without causing any lowering of the convertible fins.

The left-hand landing gear actuating cylinder 104, the landing gear selector valve 19, and the hydraulic lines 103, 105 and 108—111 are interconnected as specified above in connection with Figure 8. A pair of two-way selector valves 112, 113 for the convertible fins are mechanically linked to each other and to the landing gear selector valve 19 by a linkage 114. The line 103 to the landing gear cylinder 104 is connected by a line 115 to one fin valve 112, while the other line 105 to the cylinder 104 is connected to the matching valve 113 by a line 116. The fin valves 112, 113 are respectively connected to the closed end 117 and to the end 118 pierced by the piston rod 94 of the fin actuating cylinder 12 by the lines 17, 18.

A wing droop selector valve 119 receives hydraulic fluid under high pressure from a line 120 connected to the pressure port of a source of hydraulic power (not shown), and returns fluid to the hydraulic power source through the line 121. Through respective interconnected lines 122, 127, and 124 the droop selector valve is connected to the left-hand droop actuating cylinder 128, the fin valve 113, and the right-hand droop actuating cylinder (not shown), connections to the named droop cylinders being made at their closed ends. The droop selector valve 119 is similarly connected to the other ends of the left-hand droop cylinder 128, the right-hand droop cylinder, and the remaining fin valve 112 by the interconnected lines 123, 125, and 126 in the order named. It is assumed that the wing droops are extended when the droop cylinder 128 is extended. The mechanical linkage 114 is such as to position the fin valves 112, 113 for connection of the fin lines 17, 115 to the landing gear line 103, and the fin lines 18, 116 to the landing gear line 105 when the landing gear selector valve 19 is positioned to connect the pressure line 101 to the landing gear line 105 for extending the landing gear. In this position of the fin valves 112, 113, the fin cylinder 12 has no connection with the wing droop hydraulic system selector valve 119. The valves 112, 113 remain positioned as described until the landing gear selector valve 19 is positioned for retracting landing gear by connecting the pressure line 101 to the landing gear line 103, at which time the linkage 114 positions the fin valves 112, 113 so as to connect the fin lines 17, 126 to the droop line 123, and the fin lines 18, 127 to the droop line 122, thus connecting the fin cylinder 12 to the wing droop hydraulic system, and discontinuing all connection with the landing gear hydraulic system.

The operation of the convertible fins and their actuating and control means will now be described.

With reference to Figure 8, the connection of the landing gear cylinder 104 to the corresponding left-hand main gear supporting members is assumed to be such that the latter are retracted when the cylinder 104 is extended. It is further assumed that the aircraft has just taken off, and that the landing gear is yet to be retracted into the fuselage. To retract the landing gear, the landing gear selector valve 19 is positioned so as to connect the pressure line 101 through the line 103 to the closed end 106 of the landing gear actuating cylinder 104. At the same time, the return line 102 is connected through the line 105 to the opposite end 107 of the landing gear cylinder 104. The closed end 117 of the fin actuating cylinder 12 is connected through the lines 17, 103 to the pressure line 101, while the opposite end 118 of the fin cylinder is similarly connected, through the lines 18, 105 with the return line 102. Thus, through the connections described, hydraulic fluid is admitted under high pressure into the respective closed ends of the cylinders 12, 104, the pistons 129, 130 of the cylinders 12, 104 are moved by fluid pressure from their respective retracted positions shown in dotted lines to their extended positions shown in solid lines, and the fluid displaced from the cylinders 12, 104 ahead of the respective pistons is discharged through the lines 18, 105 into the return line 102. This sequence is accompanied by retraction of the left-hand main landing gear, and, with added reference to Figure 6, by outward and upward pivoting of the fin horn ends 89A, 89B about the aft pivot pins 90A, 90B, thus pivoting the fins 28A, 28B in unison on those pins and on the forward hinge pins to their "down" position shown in dotted lines. In this position, the fins 28A, 28B are substantially vertical and extend symmetrically downward from the fuselage aft section 23 at the same angle to the fuselage vertical centerline. The fin cylinder 12, being pivotally mounted at its ends on the fin horn ends 89A, 89B, moves upward and expands outward with the horn ends to its position shown in dotted lines, and corresponding motions of course occur in the flexible hydraulic lines 17, 18 connected to the cylinder 12. The fin tips lie somewhat outboard of the corresponding fin roots; hence, the fins 28A, 28B deviate somewhat from the vertical. This deviation, however, does not obviate the effectivity of the convertible fins, in their "down" position, in imparting directional stability to the aircraft. If desired, the fins 28A, 28B may readily be made to extend entirely vertically downward from the fuselage aft section 23 by the simple expedient of modifying the stroke of the fin actuator 12 and/or the fin horns 88A, 88B to extend the range of downward pivoting of the fins.

Referring to Figure 2, the various fairing members 39—43 and the fuselage forward and aft hinge fitting ends 32, 33, 34 are rigidly attached to the fuselage aft section 23 and do not move when the fin 28A is pivoted, while rotation is experienced, as described, by the fin forward and aft hinge fitting ends 35, 36. As the fuselage and fin hinge fitting ends 32—36 and the semi-cylindrical fairing members 41, 42, 43 are all of matching diameters and have a common centerline of cylindricality, on which centerline the fin fitting ends 35, 36 are pivoted, the exterior surfaces of the semi-cylindrical fairings 41, 42, 43 and the fin and fuselage hinge fitting ends 32—36 lie flush with each other and present an aerodynamically smooth, virtually unbroken composite surface which is not disturbed or disrupted at any time during the rotation in either direction of the fin hinge fitting ends 35, 36. Streamlining of this composite surface is accomplished by the forward and aft tapered fairings 39, 40 which respectively fair the forward end of the forward semi-cylindrical fairing 41 and the aft end of the aft semi-cylindrical fairing 43 to the fuselage skin 55. The hinge fitting ends 32—36 which protrude respectively from the fuselage aft section 23 or from the fin root 50 thus effect little if any measurable increase in the overall aerodynamic drag on the fuselage 20. Any considerable gap between the fin root 50 and the fairings 39—43 and hinge fitting ends 32—36 would constitute a source of drag. Drag from such a source is obviated, however, by the close fit of the fin upper and lower skins 74, 75 (Figure 3) against the fairing members 39—43 and hinge fitting ends 32—36 in all positions of the fin 28A.

With the landing gear up, the aircraft, when in subsonic flight, is provided with adequate longitudinal stability by the horizontal tail surfaces 22A, 22B (Figure 1), and with adequate directional stability by the vertical stabilizer 24 and rudder 25. The convertible fins 28A, 28B, as described, are in their "down" position. As each fin 28A or 28B is symmetrically formed about its chord and is aligned, through its mounting means, with the direction of flight, airflow about the fin is symmetrical and the fin produces no sideward moment of force on the fuselage aft section 23 as long as no yawing of the fuselage 20 occurs. When yawing occurs, the fins 28A, 28B, because of their form and location, of course make some contribution to the directional stability of the aircraft, and this contribution, while not especially needed or required in subsonic flight, is by no means deleterious, and may be to some degree helpful.

When the aircraft is accelerated to supersonic speeds, however, its stability characteristics undergo marked alteration: the longitudinal stability attributable to the wing 44 and horizontal tail surfaces 22A, 22B tends to increase, while the directional stability afforded by the vertical stabilizer 24 and rudder 25 tends to deteriorate with increase in positive speed and with increase in angle of attack until, in an aircraft not equipped with the convertible fins 28A, 28B of the present invention, directional stability may become virtually zero. A major cause of this deterioration of directional stability lies in the vortices set up about the vertical stabilizer 24 and rudder 25 by the passage of the fuselage 20 and wing 44 through the air, and because of the flow separation over the upper surface of the wing at high angles of attack which are obtained in climbing or maneuvering flight.

Under such conditions, however, airflow beneath the fuselage aft section 23 is relatively smooth and undisturbed, and it is into this latter area of airflow that the downwardly directed convertible fins 28A, 28B extend. As previously noted, the fins 28A, 28B exert no sideward forces when the aircraft is in straight flight. When a yaw occurs, the fins 28A, 28B are no longer in chordwise alignment with the direction of flight, and the airstream is directed at an angle against the surface of each fin 28A, 28B on the side of the fin toward which the fuselage aft section 23 has been swung by the yaw. As a result of this airflow, aerodynamic forces are directed against the fins 28A, 28B in a direction opposite to the direction of the yawing motion of the fuselage aft section 23, and are transmitted into the fuselage aft section 23 through the fins' mounting means. These forces operate to swing the fuselage 20 back into coordinated flight. With the yawing motion corrected, the fins 28A, 28B are again in chordwise alignment with the direction of airflow, in which position they impose no sideward forces on the fuselage aft section 23.

At low flight speeds and with the landing gear extended, the longitudinal stability of most aircraft adapted for supersonic flight tends to become marginal, while the directional stability imparted by the vertical stabilizer and rudder is entirely adequate. In the aircraft of the example, the convertible fins 28A, 28B are raised to their "up," substantially horizontal, position when, for instance, the landing gear is extended, in which position they serve as horizontal stabilizers and raise the longitudinal stability of the aircraft to a satisfactory level, thus much improving longitudinal control of the aircraft in the landing condition. Since the convertible fins 28A, 28B lie considerably below the horizontal tail surfaces 22A, 22B and as their leading edges are well forward of the leading edges of those surfaces 22A, 22B, no aerodynamic interference or increase of drag, such as would occur if the convertible fins 28A, 28B and horizontal tail surfaces 22A, 22B lay closely spaced and in register with each other, is experienced.

The raising of the convertible fins 28A, 28B to their "up" position is accomplished automatically, as contemplated in Figure 8, when the landing gear is extended. A brief description of the raising of the fins, which occurs when the landing gear is extended, follows.

When the landing gear selector valve 19 (Figure 8) is positioned to direct hydraulic fluid under high pressure from the pressure line 101 through the lines 105 and 18 into the ends 107, 118 of the landing gear and fin actuating cylinders 104, 12, the return line 102 is connected through the lines 103, 17 to the opposite ends 106, 117 of those cylinders and receives the hydraulic fluid which is discharged therefrom ahead of the pistons 130, 129 which are forced into their retracted positions by fluid pressure. This sequence simultaneously effects extension of the landing gear and deflection in unison of the convertible fins 28A, 28B to their substantially horizontal "up" position.

It should be understood in connection with the mode of operation of the convertible fins 28A, 28B just described, as well as in connection with an alternate mode of operation described below, that when the fin cylinder 12 has been extended to lower the fins 28A, 28B, or when it has been retracted to raise them, the fin cylinder piston 129 (and hence the fins 28A, 28B) are locked in position by the hydraulic fluid entrapped in the fin cylinder 12, and cannot be moved until fluid is redirected into the cylinder 12 for effecting a change in position of the piston 129.

Referring to Figure 9, let it be assumed that the aircraft's landing gear is extended and that the aircraft rests on the ground. The convertible fin valves 112, 113, through the mechanical linkage 114, are positioned so as to connect the lines 17, 18 of the fin cylinder through the lines 115, 116 to the lines 103, 105 of the landing gear cylinder, and to cut off any connection of the fin cylinder lines 17, 18 to any of the lines leading to the droop cylinder 128. Hence, the wing droops may be extended and retracted for testing or other purposes without effecting any actuation of the convertible fins. The mechanical linkage 114 operates so as to connect the fin lines 17, 18 through the lines 126, 127 to the droop lines 123, 122 only when the landing gear selector valve 19 is positioned so as to effect raising of the landing gear.

Soon after takeoff, such positioning of the landing gear selector valve 19 is accomplished, and fluid flowing into the cylinder 104 through the line 103 extends the cylinder 104 and so effects retraction of the left-hand gear. Hydraulic fluid simultaneously supplied to the other landing gear actuating cylinders of the aircraft brings about retraction of the right-hand gear and nose gear. The convertible fins experience no change of position, however, because they are disconnected from the landing gear hydraulic system and connected to the wing droop hydraulic system by motion transmitted from the landing gear valve 104 through the mechanical linkage 114 to the fin valves 112 and 113 at the time of positioning the landing gear valve 19 so as to cause retraction of the landing gear.

Upon reaching proper airspeed, the wing droops of the aircraft are caused to retract by positioning the droop valve 119 so as to connect the closed end 131 of the left-hand droop cylinder 128 to the return line 121 through the line 122, and the other end of the cylinder 128 to the pressure line 120 through the line 123, at which time high-pressure fluid admitted into the cylinder 128 retracts the cylinder 128 and consequently retracts the wing droop.

As the landing gear selector valve 19 has been positioned for raising the landing gear, the fin valves 112, 113 are positioned so as to connect the fin cylinder closed end 117 through the lines 17, 126 into the droop cylinder line 123 which receives fluid under high pressure from the pressure line 120, and connects the fin cylinder's other end 118 through the fin lines 18, 127 and the droop cylinder line 122 into the return line 121. Consequently, the fin cylinder 12 is extended and the fins 28A, 28B are lowered by hydraulic fluid under high pressure which enters the closed end 117 of the fin cylinder 12 through the lines 123, 126, 17, and fluid pushed out of the cylinder 12 by movement of the piston 129 is directed through the lines 18, 127, and 122 into the return line 121.

When the aircraft is again prepared for a landing, the wing droops are extended and the convertible fins are raised by positioning the selector valve 119 so as to direct fluid under pressure through the lines 120, 122 into the droop cylinder 128 and through the lines 120, 122, 127, and 18 into the fin cylinder 12. In the event that, for some reason, the wing droops are not extended as described, the convertible fins of course may remain in their "down" position. When the landing gear valve 19 is positioned to lower the landing gear, however, the fin valves 112, 113 re-connect the fin cylinder lines 17, 18 through the lines 115, 116 with the landing gear lines 103 and 105, and hydraulic fluid thereby supplied to the fin cylinder 12 causes retraction of that cylinder and raising of the convertible fins to a safe position for landing.

While only one embodiment of the invention has been shown in the accompanying drawings, it will be evident that various modifications will be possible in the arrangement and construction of the convertible fin for aircraft without departing from the scope of the invention.

I claim:

1. For stabilizing a supersonic aircraft having directional and longitudinal stabilizing means and means for adapting said aircraft for high-speed flight and for take-off and landing, a stabilizing apparatus comprising, in combination with said means for adapting said aircraft: means in addition to said directional and longitudinal stablizing means for inducing additional directional stability at supersonic speeds, said additional means being convertible to means for inducing additional longitudinal stability at less than supersonic speeds; actuating means for effecting conversion of said additional means; and control means for causing said actuating means invariably to effect conversion of said additional means to means for inducing additional longitudinal stability when said aircraft is adapted for low-speed flight and landing, said control means being responsive to operation of said means for adapting said aircraft for high-speed flight and for low-speed flight and landing.

2. A stabilizing apparatus for an aircraft adapted for supersonic flight, said aircraft having a fuselage, extendible landing gear, and vertical and horizontal tail surfaces mounted on said fuselage, said stabilizing apparatus comprising, in combination with said landing gear: means for extending and retracting said landing gear; a fin symmetrically formed about its chordplane and ventrally located on a rearward section of said fuselage in downwardly and longitudinally spaced relation to said horizontal tail surfaces; fin mounting means for rendering said fin pivotally translocatable for movement on an axis adjacent an outer surface of and extending generally longitudinally of said fuselage; actuating means connected to said fin for pivoting the same on said axis between a first position wherein said fin extends downwardly below said fuselage and a second position wherein said fin extends laterally from said fuselage; and control means causing said fin invariably to be moved by said actuating means to said first position upon retraction of said landing gear and to said second position upon extension of said landing gear, said control means being connected with said actuating means and said means for extending and retracting said landing gear, whereby, said fin contributes directional stability to said aircraft during supersonic flight and longitudinal stability during flight with said landing gear extended.

3. For an aircraft adapted for supersonic flight and having a fuselage, extendible landing gear, and vertical and horizontal tail surfaces mounted on said fuselage, a stabilizing apparatus comprising, in combination with said landing gear: means in said aircraft for extending and retracting said landing gear; a pair of fins symmetrically formed about their chordplanes; means for mounting said fins on a rearward section of said fuselage in vertically and longitudinally spaced relation to said horizontal tail surfaces, said means including axes adjacent to and extending generally longitudinally of said fuselage; and actuating means operable for simultaneously pivoting said fins on their axes between a first position wherein said fins extend downwardly below said fuselage and a second position wherein said fins extend laterally from said fuselage; and control means for causing said fins invariably to be moved by said actuating means to said first position upon extension of said landing gear and to said second position upon retraction of said landing gear, said control means being connected with said actuating means and said means for positioning said landing gear, whereby, said fins contribute directional stability to said aircraft during supersonic flight and longitudinal stability during flight with said landing gear extended.

4. For an aircraft adapted for supersonic flight and having vertical and horizontal tail surfaces and a body routinely placed in one position for high-speed flight and in another position during low-speed flight, in combination with said body, a stabilizing apparatus comprising: positioning means for selectively placing said body in said one or other position thereof; a fin ventrally located on a rearward section of said aircraft in downwardly and longitudinally spaced relation to said horizontal tail surfaces; fin mounting means for rendering said fin translocatable for movement on an axis adjacent to an outer surface of and extending generally longitudinally of said aircraft; actuating means for moving said fin about said generally longitudinally extending axis between a first location wherein, during supersonic flight, it extends downwardly into relatively smooth air below said aircraft and contributes to the directional stability of said aircraft, and a second location wherein said fin extends laterally from and contributes to the longitudinal stability of said aircraft; and control means causing said fin invariably to be moved by said actuating means to said first position upon movement of said body to said one position and to said second position upon movement of said body to said other position, said control means being connected with said actuating means and said positioning means, whereby, said fin contributes directional stability to said aircraft when said body is placed in said one position for high-speed flight and contributes longitudinal stability when said body is placed in said other position.

5. For an aircraft adapted for supersonic flight and having a fuselage, vertical and horizontal tail surfaces mounted on the fuselage, and a body routinely placed in one position for high-speed flight and in another position during low-speed flight of said aircraft, in combination with said body, a stabilizing apparatus comprising: positioning means for selectively placing said body in said one or other position thereof; a pair of fins symmetrically formed about their chordplanes; means for mounting said fins on a rearward section of said fuselage in vertically and longitudinally spaced relation to said horizontal tail surfaces, said means including axes adjacent to and extending generally longitudinally of said fuselage; means for simultaneously pivoting said fins on their axes between a first position wherein they extend downwardly below said fuselage and a second position wherein they extend laterally from said fuselage; and control means causing said fins invariably to be moved by said actuating means to said first position upon movement of said body to said one position and to said second position upon movement of said body to said other position, said control means being connected with said actuating means and said positioning means, whereby, said fins contribute directional stability to said aircraft when said body is placed in said one position for high-speed flight and contribute longitudinal stability when said body is placed in said other position.

6. A stabilizing apparatus for a supersonic aircraft having extendible landing gear mounted thereon, first means selectively operable for extending and retracting said landing gear, and a part distinct from said landing gear and movable into a position best suited for high-speed flight and into a position best suited for low-speed flight, landing, and takeoff of said aircraft, said aircraft further having second means selectively operable for moving said part into its position best suited for high-speed flight and into its position best suited for low-speed flight, landing, and takeoff, said aircraft having a fuselage with vertical and horizontal tail surfaces mounted thereon, said stabilizing apparatus comprising: a fin symmetrically formed about its chordplane and ventrally located on a rearward section of said fuselage in downwardly and longitudinally spaced relation to said horizontal tail surfaces and substantially in chordwise alignment with the normal direction of flight of said aircraft; fin mounting provisions for rendering said fin pivotably translocatable for movement on an axis adjacent an outer surface of and extending generally longitudinally of said fuselage; and third means connected to said fin for pivoting the same on said axis and responsive to operation of said second means only when said first means has been operated for retraction of said landing gear, said third means further being responsive to operation of said first means when the latter is operated for extension of said landing gear, said third means being operative and responsive in such manner that, with said landing gear retracted and in response to operation of said second means for moving said part into its position best suited for high-speed flight, said fin is pivoted by said third means to a first location wherein in supersonic flight it extends downwardly into relatively smooth air below said fuselage and contributes to the directional stability of said aircraft, and in response to operation of said second means for moving said part into its position best suited for low-speed flight said fin is pivoted into a second location wherein it extends laterally from and contributes to the longitudinal stability of said aircraft.

7. For a supersonic aircraft having extendible landing gear mounted thereon, first means normally moved to a particular position for adapting said aircraft for high-speed flight, second means normally moved to a particular position for adapting said aircraft for low-speed flight and landing and including said landing gear, means selectively operable for moving said first and second means to their respective particular positions for adapting the aircraft for high-speed flight and for low-speed flight and landing, said aircraft having a fuselage with vertical and horizontal tail surfaces mounted thereon, a stabilizing apparatus comprising: a pair of fins symmetrically formed about their chordplanes; means for mounting said fins on a rearward section of said fuselage in vertically and longitudinally spaced relation to said horizontal tail surfaces and substantially in chordwise alignment with the normal direction of flight of said aircraft, said mounting means including axes adjacent to and extending longitudinally of said fuselage; and means responsive to operation of said means selectively operable for moving said first and second means for simultaneously pivoting said fins on their axes, whereby, when said first means is moved to said position adapting said aircraft for high-speed flight, said fins are pivoted to a first position wherein they extend downwardly below and contribute to the directional stability of said fuselage, and when said second means is moved to said position adapting said aircraft for low-speed flight and landing, said fins are pivoted to a second position wherein they extend laterally from and contribute to the longitudinal stability of said fuselage.

References Cited in the file of this patent

UNITED STATES PATENTS

| | | |
|---|---|---|
| 2,397,526 | Bonbright | Apr. 2, 1946 |
| 2,562,905 | Gadeberg | Aug. 7, 1951 |

FOREIGN PATENTS

| | | |
|---|---|---|
| 525,645 | Great Britain | Mar. 19, 1935 |
| 575,471 | Great Britain | Feb. 19, 1946 |